Feb. 23, 1937.   E. L. BARRETT ET AL   2,071,383
MECHANICAL POWER TRANSMITTING OR RECEIVING DEVICE
Filed Nov. 9, 1933
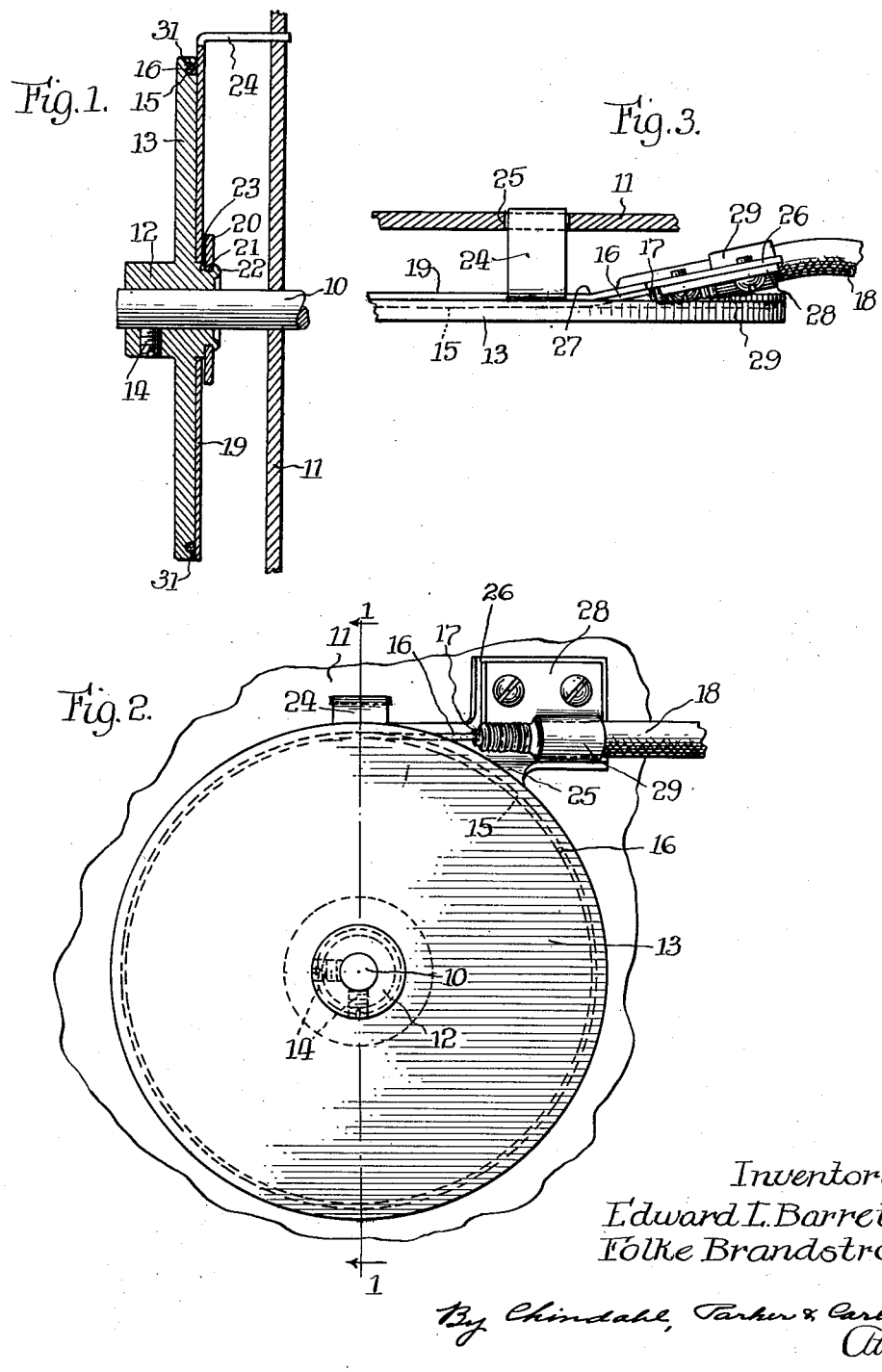
Inventors:-
Edward L. Barrett,
Folke Brandstrom,
By Chindahl, Parker & Carlson
Attys.

Patented Feb. 23, 1937

2,071,383

UNITED STATES PATENT OFFICE 2,071,383

MECHANICAL POWER TRANSMITTING OR RECEIVING DEVICE

Edward L. Barrett, La Grange, and Folke Brandstrom, Chicago, Ill., assignors to Utah Radio Products Company, Chicago, Ill., a corporation of Illinois Application November 9, 1933, Serial No. 697,274

10 Claims. (Cl. 74—501)

The invention relates to a mechanical power transmitting or receiving device and more particularly to devices which operate in connection with a reciprocating flexible power transmitting element. Mechanism embodying a device of this general type is illustrated and described in copending application Serial No. 697,146, filed November 8, 1933.

An object of the invention is to provide in a power transmitting or receiving device embodying a member movable to reciprocate a flexible element longitudinally or to be moved by reciprocation of such an element, means for maintaining engagement between said member and the element which is adapted to follow eccentricities of movement of said member.

A further object, more specifically stated, is to provide, in a device of this character, a rotatable member having an outwardly facing groove in a side face thereof for engagement with an associated flexible power transmitting element, and a non-rotatable abutment overlying and closing said groove and having movement to follow lateral gyrations or rotational eccentricities of said member.

Another object is to provide means for maintaining a close association between a flexible power transmitting element and a rotatable member associated therewith which simplifies the assembly of the rotating member on its axis.

Other objects and advantages will become apparent in the following description and from the accompanying drawing, in which:

Figure 1 is an axial section through a device embodying the features of the invention and is taken as indicated by the line 1—1 of Fig. 2.

Fig. 2 is a front elevation of the device.

Fig. 3 is a fragmentary plan view showing the guide means.

While the invention is susceptible of various modifications and alternative constructions, we have shown in the drawing and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

In the exemplary form of device which is illustrated in the drawing, 10 designates a rotatable shaft which may be either a driving shaft for producing power to be transmitted or a driven shaft deriving power from a remote source. In the present instance the shaft is, for convenience, considered as being of the latter type. The shaft is rotatably supported in any suitable manner as by a wall or panel 11 through which it extends. Mounted on the extended end of the shaft is a hub 12 from an intermediate part of which a disk 13 or the like extends radially. Such means as set screws 14 in the hub at one side of the disk connect the hub and disk assembly rigidly with the shaft 10.

One side face of the disk has an annular or circular groove 15 therein which faces outwardly of the side face and is dimensioned snugly to receive an end portion of a flexible power transmitting element or cable 16. The end of the cable is suitably fixed in the groove. The cable is guided for reciprocatory movement, preferably by a flexible helicoidal winding 17, having an enclosing fabric sheath 18 thereon.

To prevent lateral displacement of the cable from the groove an abutting member is provided in overlying relation to the open face of the groove. In this instance the member is in the form of a plate 19. In order that the cable may enter and leave the groove the plate must have relative movement with respect to the disk, or in other words must be non-rotatable. However it is highly desirable that a close abutment of the plate be maintained with substantially the entire portion of the disk in which the groove is located in order to hold the cable against all movement other than along its length. To avoid the necessity for accurately finishing and adjusting the parts so that the disk and plate are exactly radial of the shaft axis, the desired end may be attained by mounting the plate to permit it to follow any eccentric gyratory or lateral wobbling movements of the rotating disk out of its plane of rotation.

A preferred arrangement for attaining this end is shown in Fig. 1. The plate 19 is centrally apertured to fit snugly but relatively movably about the hub 12 and in abutment with the side face of the disk in which the groove 15 is formed. A washer 20 or the like is fixed to the hub between a shoulder 21 on the hub and the upset outer end 22 of the hub whereby to hold the plate in place. However the shoulder 21 is disposed to provide limited clearance 23 between the plate and washer which allows the plate to tip or tilt relative to the hub in following eccentricities of movement of the disk. Consequently the plate is held in close abutment with the disk at all times. Rotation of the plate may be suitably prevented by forming an integral finger 24 on the plate for loose engagement within an aperture 25 (Fig. 3) in a stationary part, such as the panel 11.

If desired, the means for supporting and guiding the flexible cable may, in part, be formed integrally with the plate. Proper entrance and egress of the cable from the groove is attained by directing its longitudinal movement toward and away from the groove tangentially thereof and toward the groove at an angle to the plane of the disk face. Thus the plate has an outward extension 26 constituting a bracket formed integrally therewith. At a point which is substantially opposed to the groove, when the parts are assembled, the extension is bent slightly to slope away from the disk, as may be seen at 27 (Fig. 3).

Cooperating with the extension is a detachable clamping plate 28 for securing the end of the winding 17 and sheath 18 to the plate in such position that the cable is properly directed toward the groove. Preferably both the extension and clamping plate are stamped or otherwise formed, as at 29, to provide therebetween an accurately alined cylindrical bore for receiving the end of the winding 17. By this construction, as the cable passes from the winding it is directed toward the groove at an angle and at the proper point in its travel is bent by the plate and extension to pass into the groove. Preferably the wall of the groove, which is radially outside the cable, has a rounded outer margin, indicated at 30 (Fig. 1), to facilitate movement of the cable into and out of the groove.

It will be evident from the foregoing that a novel structure has been provided by which a thrust or tensional force may be transmitted from or received by a movable part. Due to the fact that the portion of the cable which engages the rotating disk moves therewith, friction is eliminated and the movably related plate overlying the groove positively confine the entire disk engaging length of the cable to the groove.

We claim as our invention:

1. In a device of the character described the combination of a rotatable shaft, a disk having a hub fixed on said shaft, a plate disposed on said hub in abutment with a side face of said disk, a washer fixed to said hub to hold said plate in place and having clearance with said plate to allow limited relative axial movement therebetween, a finger on said plate loosely engaging a stationary part to hold said plate against rotative movement with said disk but permitting other movement, a power transmitting element, said disk having a groove therein facing said plate for receiving said element, and means on said plate for directing longitudinal movement of said element toward said groove substantially tangentially and at an angle thereto.

2. In a device of the character described the combination of a rotatable shaft, a disk having a hub fixed on said shaft, a plate disposed on said hub in abutment with a side face of said disk, means for loosely holding said plate in place to permit said plate to move axially to a limited extent relative to said hub, means for holding said plate against rotative movement with said disk, a power transmitting element, said disk and plate having an interposed groove therebetween for receiving said element, and means on said plate for directing said element into said groove.

3. In a device of the character described the combination of a rotatable shaft, a disk on said shaft, a plate disposed in abutment with a side face of said disk, means for holding said plate in place and having clearance with said plate to allow limited relative movement therebetween means for holding said plate only against rotative movement with said disk, a power transmitting element, said disk having a groove therein facing said plate for receiving said element, and guide means on said plate for directing longitudinal movement of said element toward said groove at an angle thereto and for bending said element into engagement with said groove.

4. In a device of the character described the combination of a rotatable shaft, a disk fixed on said shaft, a plate disposed in abutment with a side face of said disk, means for holding said plate in place and having clearance with said plate to allow limited relative movement therebetween, means for holding said plate against rotative movement with said disk while otherwise permitting said limited movement, a power transmitting element having a tubular enclosing guide, said disk having a groove therein facing said plate for receiving said element, and clamping means on said plate holding the end of said guide to direct longitudinal movement of said element toward said groove at an angle thereto, said clamping means and plate being angularly related to bend said element into engagement with said groove.

5. In a device of the character described, the combination of a flexible reciprocatory element, a rotatable member having an element receiving groove in a side face thereof, means abutting said side face and overlying said groove to confine said element against movement relative to said member, and means for fixing the abutting means against rotation while otherwise permitting movement thereof to follow eccentric movements of said side face.

6. In a device of the character described, the combination of a flexible element, a member connected for movement therewith and having an element receiving recess therein, supporting means and means movably supported by said supporting means for relative movement to maintain said element in said recess against movement of said element relative to said member and for conjoint movement otherwise to follow lateral movement of said member relative to said recess.

7. In a device of the character described, the combination of a flexible reciprocatory element, a member connected for movement therewith, means for maintaining a close association of said element and member, and supporting means for the maintainng means loosely associated therewith to provide for movement of said maintaining means to follow lateral movement of said member relative to said element.

8. In a device of the character described, the combination of a flexible element, a member connected for movement therewith and having an element receiving recess therein, supporting means and a part movably supported by said supporting means for relative movement to retain said element in said recess against movement of said element relative to said member, and including a laterally projecting portion in connection with said supporting means affording restraint against movement of said part in one direction but arranged to permit conjoint movement of said member and part otherwise to follow lateral movement of said member relative to said recess.

9. In a device of the character described, the combination of a flexible reciprocatory element, a rotatable member connected with said element for movement as said element reciprocates, means for confining the member-engaging portion of said element against movement relative to said member, and means for supporting the confining means in a given position but permitting movement of said means to follow other than rotational movements of said member.

10. In a device of the character described, a rotatable member including a substantially flat side face portion having a groove therein, a flexible reciprocatory element fitting in said groove, a member overlying said groove in abutment with said side face portion to confine the part of said element within said groove against movement relative to said member, and means for restraining said part against rotation with said member but permitting said part to follow eccentric gyratory or lateral wobbling movements of said member.

EDWARD L. BARRETT.
FOLKE BRANDSTROM.